(12) United States Patent
Wang et al.

(10) Patent No.: US 12,326,901 B2
(45) Date of Patent: Jun. 10, 2025

(54) METHOD, DEVICE, AND COMPUTER PROGRAM PRODUCT FOR PROCESSING WORKFLOW CHART

(71) Applicant: Dell Products L.P., Round Rock, TX (US)

(72) Inventors: Zijia Wang, Weifang (CN); Zhisong Liu, Shenzhen (CN); Zhen Jia, Shanghai (CN)

(73) Assignee: Dell Products L.P., Round Rock, TX (US)

(*) Notice: Subject to any disclaimer, the term of this patent is extended or adjusted under 35 U.S.C. 154(b) by 34 days.

(21) Appl. No.: 18/503,829

(22) Filed: Nov. 7, 2023

(65) Prior Publication Data

US 2025/0124082 A1    Apr. 17, 2025

(30) Foreign Application Priority Data

Oct. 13, 2023 (CN) .......................... 202311329547.1

(51) Int. Cl.
*G06F 17/30* (2006.01)
*G06F 16/901* (2019.01)
*G06F 40/20* (2020.01)

(52) U.S. Cl.
CPC .......... *G06F 16/9024* (2019.01); *G06F 40/20* (2020.01)

(58) Field of Classification Search
CPC ........ G06F 16/13; G06F 16/24; G06F 16/156; G06F 3/1297; G06N 3/00; G06N 5/00;

(Continued)

(56) References Cited

U.S. PATENT DOCUMENTS 4,167,788 A * 9/1979 Senba ..................... G06F 9/262
                                                    700/86
6,216,260 B1 * 4/2001 Neyfakh ............... G06F 30/327
                                                    716/134

(Continued)

OTHER PUBLICATIONS

T. B. Brown et al., "Language Models are Few-Shot Learners," arXiv:2005.14165v4, Jul. 22, 2020, 75 pages.

(Continued)

*Primary Examiner* — Hung D Le
(74) *Attorney, Agent, or Firm* — Ryan, Mason & Lewis, LLP (57) ABSTRACT

Example embodiments of the present disclosure provide a method, a device, and a computer program product for processing a workflow chart. The method includes encoding structural information of the workflow chart including a plurality of nodes and a plurality of edges by using a graph neural network to acquire a vector representation of the structural information; acquiring textual description data about the workflow chart at the nodes; training a language model based on the acquired textual description data and the acquired vector representation to acquire a pretrained language model; and fine-tuning the pretrained language model through training data of a specific task to acquire a fine-tuned language model. Through the method for processing the workflow chart of the present disclosure, the combination of the graph neural network and the language model not only can process a large number of complex workflow charts, but also can generate effective natural language outputs.

20 Claims, 5 Drawing Sheets

(58) Field of Classification Search
CPC ....... G05B 13/00; H03M 7/30; H04N 9/8042; G06T 9/00
See application file for complete search history.

(56) References Cited

U.S. PATENT DOCUMENTS

| | | | | |
|---|---|---|---|---|
| 7,251,683 | B1* | 7/2007 | Shah | G06Q 30/06 709/219 |
| 2003/0182334 | A1* | 9/2003 | Ryu | G06F 8/10 708/160 |
| 2004/0174390 | A1* | 9/2004 | Shah | G06Q 10/10 370/352 |
| 2005/0091177 | A1* | 4/2005 | Przytula | G06N 7/01 706/45 |
| 2005/0177399 | A1* | 8/2005 | Park | G06Q 10/10 705/3 |
| 2007/0226732 | A1* | 9/2007 | O'Flaherty | G06F 8/34 717/174 |
| 2008/0227066 | A1* | 9/2008 | Beygelzimer | G09B 7/00 434/238 |
| 2011/0061055 | A1* | 3/2011 | Chan | G06Q 10/0631 718/102 |
| 2012/0131557 | A1* | 5/2012 | Davies | G06F 9/453 717/125 |
| 2012/0213429 | A1* | 8/2012 | Vasudevan | G06V 30/422 382/176 |
| 2015/0242106 | A1* | 8/2015 | Penha | G06F 3/0481 715/854 |
| 2017/0090919 | A1* | 3/2017 | Liu | G06F 8/30 |
| 2017/0284193 | A1* | 10/2017 | Zhang | E21B 47/26 |
| 2017/0316354 | A1* | 11/2017 | Rahul U | G06Q 10/0633 |
| 2024/0346339 | A1* | 10/2024 | Shtok | G06F 16/9024 |

OTHER PUBLICATIONS

R. Van Den Berg et al., "Graph Convolutional Matrix Completion," arXiv:1706.02263v2, Oct. 25, 2017, 9 pages.
T. N. Kipf et al., "Semi-Supervised Classification with Graph Convolutional Networks," arXiv:1609.02907v4, Feb. 22, 2017, 14 pages.
W.-T. Hsu et al., "A Unified Model for Extractive and Abstractive Summarization Using Inconsistency Loss," arXiv:1805.06266v2, Jul. 5, 2018, 10 pages.
J. Zhou et al., "Graph Neural Networks: A Review of Methods and Applications," AI Open, vol. 1, Apr. 8, 2021, pp. 57-81.
L. Floridi et al., "GPT 3: Its Nature, Scope, Limits, and Consequences," Minds and Machines, vol. 30, Nov. 1, 2020, pp. 681-694.

\* cited by examiner

METHOD, DEVICE, AND COMPUTER PROGRAM PRODUCT FOR PROCESSING WORKFLOW CHART

RELATED APPLICATION

The present application claims priority to Chinese Patent Application No. 202311329547.1, filed Oct. 13, 2023, and entitled "Method, Device, and Computer Program Product for Processing Workflow Chart," which is incorporated by reference herein in its entirety.

FIELD

Embodiments of the present disclosure mainly relate to the field of graph processing, in particular to a method, a device, and a computer program product for processing a workflow chart.

BACKGROUND

During an online after-sales service stage, customers (such as laptop buyers) will consult product suppliers (such as laptop after-sales service providers) online for solutions to their product faults. However, a variety of causes may cause the same product malfunction (such as a computer cannot be turned on or is automatically turned off). There are different solutions for each cause. For example, if a computer cannot be turned on, there may be improper maintenance, power fault, memory fault, computer motherboard fault, central processing unit fault, and graphics card fault. There are different solutions for different causes, so a large number of workflow charts will be generated for after-sales service to guide customers to choose an appropriate solution.

The latest development in textual language processing and machine learning generates a strong language model, such as a text-based language model, such as a Generative Pre-trained Transformer (GPT), which may generate questions similar to human language to guide customers to answer or choose options. As mentioned above, there are a large number of workflow charts for faults of electronic products such as computers. In conventional technologies, workflow charts are encoded into a picture, and the picture can show steps and conditions. The staff of customer service providers can follow the steps and conditions shown in the picture to provide consultation and service to customers. If GPT can be introduced to ask customers questions and guide them to find solutions based on their answers, the efficiency of customer service may be greatly improved, and after-sales service costs may be reduced. However, it is not feasible to directly input a graph representation of a workflow chart into GPT, because this requires encoding the graph representation into a long text prompt that GPT can understand and inputting it into GPT, which will be a significant challenge.

SUMMARY

Example embodiments of the present disclosure provide a method, a device, and a computer program product for processing a workflow chart. In an embodiment of the present disclosure, in a case where a graph representation of a workflow chart is known, a graph neural network (GNN), such as a graph convolutional network (GCN) and a graph attention network (GAT), is used to encode structural information of the graph representation to generate a soft prompt, and the soft prompt contains a complete encoding of graph information, can be understood by a basic textual language model (such as GPT), and can be directly input into GPT. A hard prompt is a text description of a specific step of the workflow chart, and the text description is a comprehensive and detailed description of the specific step of the workflow chart. According to the method of the present disclosure, both the soft prompt and the hard prompt are considered. The generated soft prompt and hard prompt are taken as inputs, and a graph finishing task is used to pretrain the GPT, so that the GPT can know a basic structure or an underlying structure of the workflow chart, namely, learning the whole workflow chart, so as to achieve a complete description of the workflow chart. In a fine-tuning process, training data for a specific task is used to fine-tune the pretrained GPT to adjust parameters thereof, and specifically, only the soft prompt and a part of hard prompt are input to finish the specific task to output a solution for the specific task, so that the performance of the GPT for the specific task is optimized. According to the method for processing a workflow chart of the present disclosure, the graph information of the workflow chart is effectively encoded into the language model, so that the trained and fine-tuned GPT can be utilized to provide effective and organized customer service. The combination of the GNN and the language model not only can process a large number of complex workflow charts, but also can generate effective natural language outputs.

In a first aspect of embodiments of the present disclosure, a method for processing a workflow chart is provided. The method includes: encoding structural information of a workflow chart comprising a plurality of nodes and a plurality of edges by using a GNN to acquire a vector representation of the structural information. The method further includes acquiring textual description data about the workflow chart at the nodes. The method further includes training a language model based on the acquired textual description data and the acquired vector representation to acquire a pretrained language model. The method further includes fine-tuning the pretrained language model through training data of a specific task to acquire a fine-tuned language model.

In a second aspect of embodiments of the present disclosure, an electronic device is provided. The electronic device includes at least one processor; and a memory, coupled to the at least one processor and having instructions stored thereon, wherein the instructions, when executed by the at least one processor, cause the electronic device to execute actions, the actions including encoding structural information of a workflow chart including a plurality of nodes and a plurality of edges by using a GNN to acquire a vector representation of the structural information. The actions further include acquiring textual description data about the workflow chart at the nodes. The actions further include training a language model based on the acquired textual description data and the acquired vector representation to acquire a pretrained language model. The actions further include fine-tuning the pretrained language model through training data of a specific task to acquire a fine-tuned language model.

In a third aspect of embodiments of the present disclosure, a computer program product is provided. The computer program product is tangibly stored on a non-transitory computer-readable medium and includes machine-executable instructions, wherein the machine-executable instructions, when executed by a machine, cause the machine to execute the method according to the first aspect of the present disclosure.

It should be understood that the content described in this Summary is neither intended to limit key or essential features of embodiments of the present disclosure, nor intended to limit the scope of the present disclosure. Other features of the present disclosure will become readily understood from the following Detailed Description.

BRIEF DESCRIPTION OF THE DRAWINGS

The above and other features, advantages, and aspects of embodiments of the present disclosure will become more apparent with reference to the accompanying drawings and the following Detailed Description. In the accompanying drawings, identical or similar reference numerals represent identical or similar elements, in which.

DETAILED DESCRIPTION

Illustrative embodiments of the present disclosure will be described below in further detail with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the scope of protection of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

As mentioned above, the latest development in textual language processing and machine learning generates a strong language model, such as a Generative Pre-trained Transformer (GPT), which may generate questions similar to human language to guide customers to answer or choose options. As mentioned above, there are a large number of workflow charts for faults of electronic products such as computers. In conventional technologies, workflow charts are encoded into a picture, and the picture can show steps and conditions. The staff of customer service providers can follow the steps and conditions shown in the picture to provide consultation and service to customers. If GPT can be introduced to ask the customers questions and guide them to find solutions based on their answers, the efficiency of customer service may be greatly improved, and after-sales service costs may be reduced. However, this requires the GPT to convert the workflow chart containing a large amount of data and graphs into a language model and provide services to customers, which will be a major challenge.

Therefore, an embodiment of the present disclosure provides a method for generating a language model for processing a workflow chart, which can acquire a language model that can process workflow charts containing a large amount of data (such as the workflow charts of solutions for various types of questions, and the workflow chart of each type of questions includes a plurality of steps, a plurality of branches, and a plurality of solutions). Through the method of the present application, graph information in a predetermined workflow chart can be encoded into a language model so that the language model can be utilized to provide effective and organized customer service.

Figure 1A:
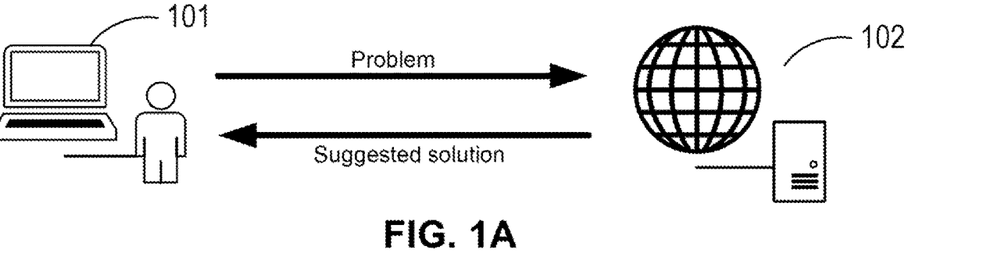
FIG. 1A shows a schematic diagram of an example environment in which multiple embodiments of the present disclosure can be implemented.

FIG. 1A shows a schematic diagram of an example environment 100 in which multiple embodiments of the present disclosure can be implemented. A computing device 102 in the example environment 100 may be any device with a computing capability. As a non-limiting example, the computing device 102 may be any type of fixed computing devices, mobile computing devices, or portable computing devices, including but not limited to a desktop computer, a laptop computer, a notebook computer, a netbook computer, a tablet computer, a multimedia computer, a mobile phone, and the like; and in addition, all or part of the components of the computing device 102 may also be distributed at a cloud.

In the example environment 100, a user 101 raises a question to the computing device 102 disposed at a cloud. For example, the question may be "the computer cannot be turned on," "the computer has a blue screen and automatically shuts down," and the like. The computing device 102 will ask a series of questions to the user 101, for example, a service code of the computer, whether the computer has a repair record, a system version of the computer, a memory capacity of the computer, the processor model, computer fault features, and the like, the user 101 answers these questions, and then the computing device 102 will predict possible computer components and provide repair suggestions to the user. For example, if the user 101 adjusts or repairs the computer according to the repair suggestions but the fault still exists, the computing device 102 may raise other questions and guide the user 101 to make a choice, and then provide new repair suggestions.

In order to enable the computing device 102 to ask an appropriate question to the user 101, and after the user 101 answers this question, raise a relevant second question until finally enabling the user 101 to identify the faulty component of the computer, the computing device 102 can process a large number of predetermined workflow charts and learn these workflow charts to raise appropriate questions and provide reasonable solutions for the faults generated by the computer, such as suggesting that the user 101 upgrade the system, upgrade BIOS, replace memory banks, and the like.

As mentioned above, the GPT can raise questions similar to human language and communicate with humans. However, in conventional technologies, there is no solution to directly input a workflow chart containing a large quantity of data and graphs into the GPT and ask customers questions.

In order to more clearly understand the method for acquiring a language model for processing a workflow chart provided by embodiments of the present disclosure, embodiments of the present disclosure will be further described with reference to FIGS. 1B to 7.

Figure 1B:
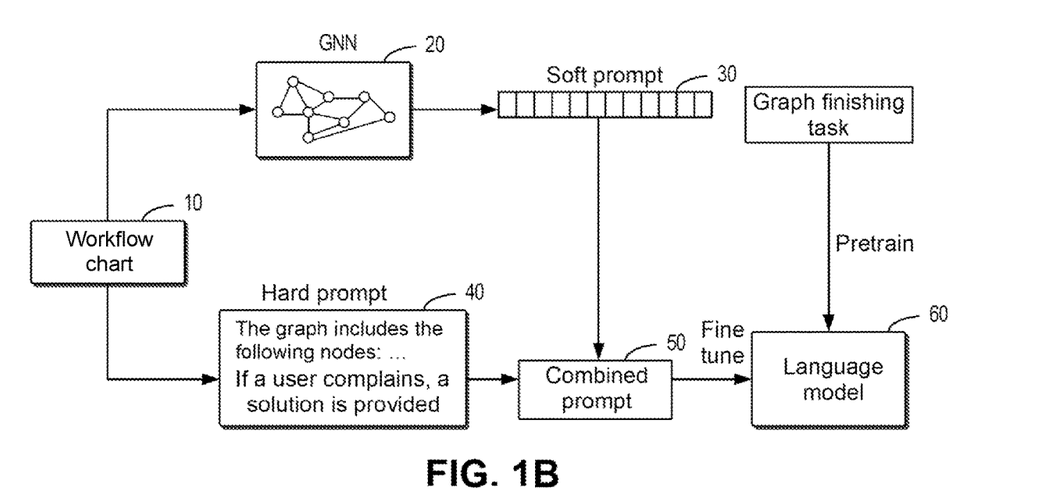
FIG. 1B shows a schematic diagram of a method for processing a workflow chart according to some embodiments of the present disclosure.

FIG. 1B shows a schematic diagram of a method for processing a workflow chart according to some embodiments of the present disclosure. As shown in FIG. 1B, a graph representation of a workflow chart 10 is input into a graph neural network (GNN) 20 to encode structural information of the graph representation, so as to generate a soft prompt 30, and the soft prompt contains a complete encoding of graph information, can be understood by a language model based on text (such as GPT), and can be directly input into the GPT. In addition, a hard prompt 40 of some nodes of the workflow chart is further obtained based on the graph representation of the workflow chart 10, and the hard prompt provides necessary details for completing a task using the language model based on text. Then, the hard prompt 40 is combined with the soft prompt 30 to obtain a combined prompt 50. The combined prompt 50 can be understood by the GPT, and therefore, it will be input into a language model 60, so as to pretrain and fine-tune the language model 60.

When the language model GPT is pretrained, based on a graph finishing task, the language model 60 can be caused to know an underlying structure of the workflow chart to achieve a complete description of the workflow chart. In addition, in a fine-tuning process, only the soft prompt and a part of hard prompt are input to finish a specific task to output a solution for the specific task, and parameters of the language model 60 are fine-tuned to optimize the performance of the specific task.

By combining advantages of the soft prompt and the hard prompt, according to the method for processing a workflow chart of the present disclosure, the graph information of the workflow chart is effectively encoded into the language model, so that the trained and fine-tuned GPT can be utilized to provide effective and organized customer service. The combination of the GNN and the language model not only can process a large number of complex workflow charts, but also can generate effective natural language outputs.

Figure 2:
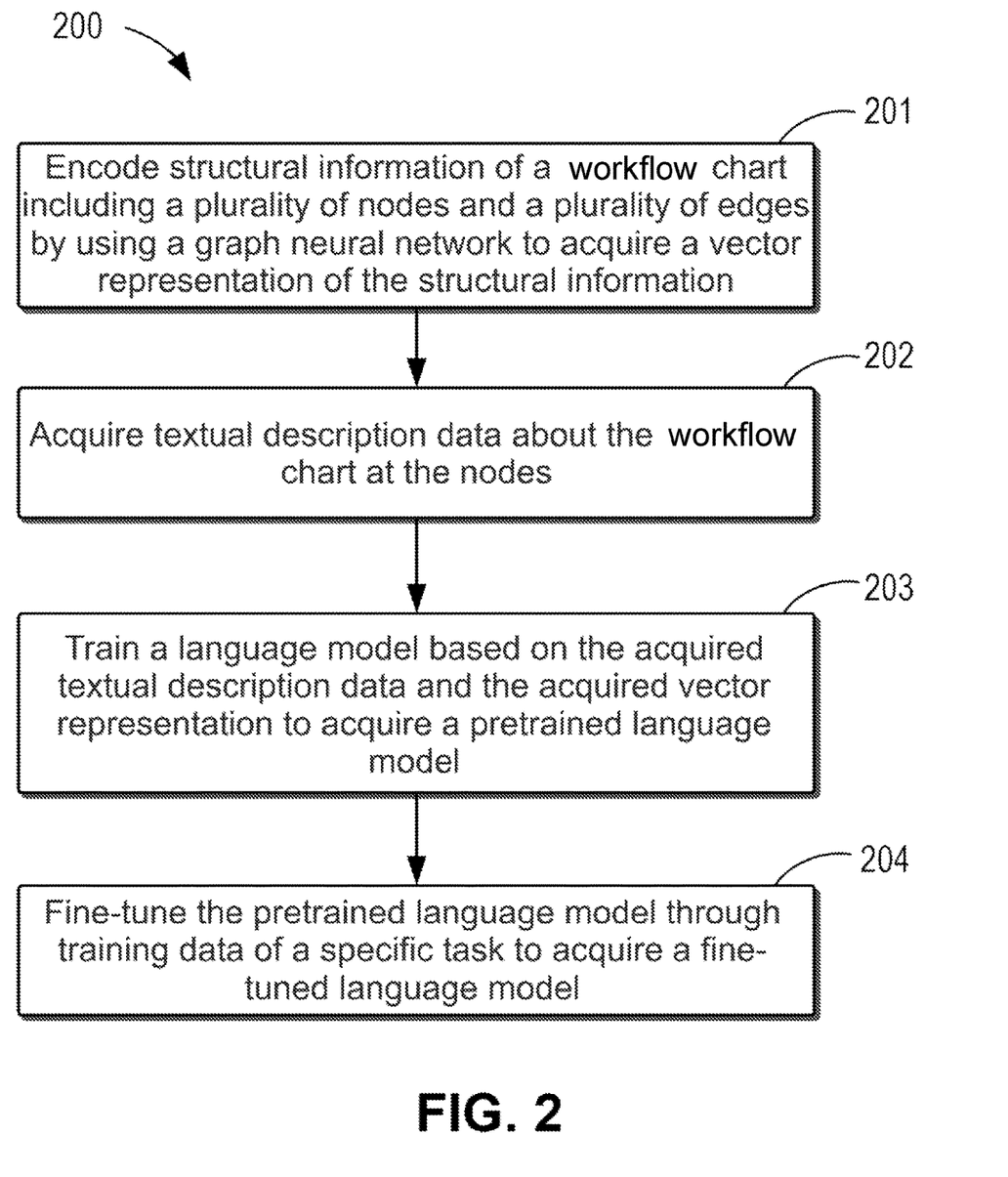
FIG. 2 shows a schematic diagram of a process for processing a workflow chart according to some embodiments of the present disclosure.

FIG. 2 shows a process 200 for processing a workflow chart according to some embodiments of the present disclosure. The process 200 may be implemented by the computing device 102 in FIG. 1. For ease of discussion, the process 200 will be described in conjunction with FIGS. 1A and 1B.

In box 201, the computing device 102 encodes structural information of a workflow chart including a plurality of nodes and a plurality of edges by using a GNN to acquire a vector representation of the structural information. In order to clearly explain a workflow chart including the plurality of nodes and the plurality of edges, a part of the workflow chart according to an example of the present disclosure will be described below with reference to FIG. 3.

Figure 3:
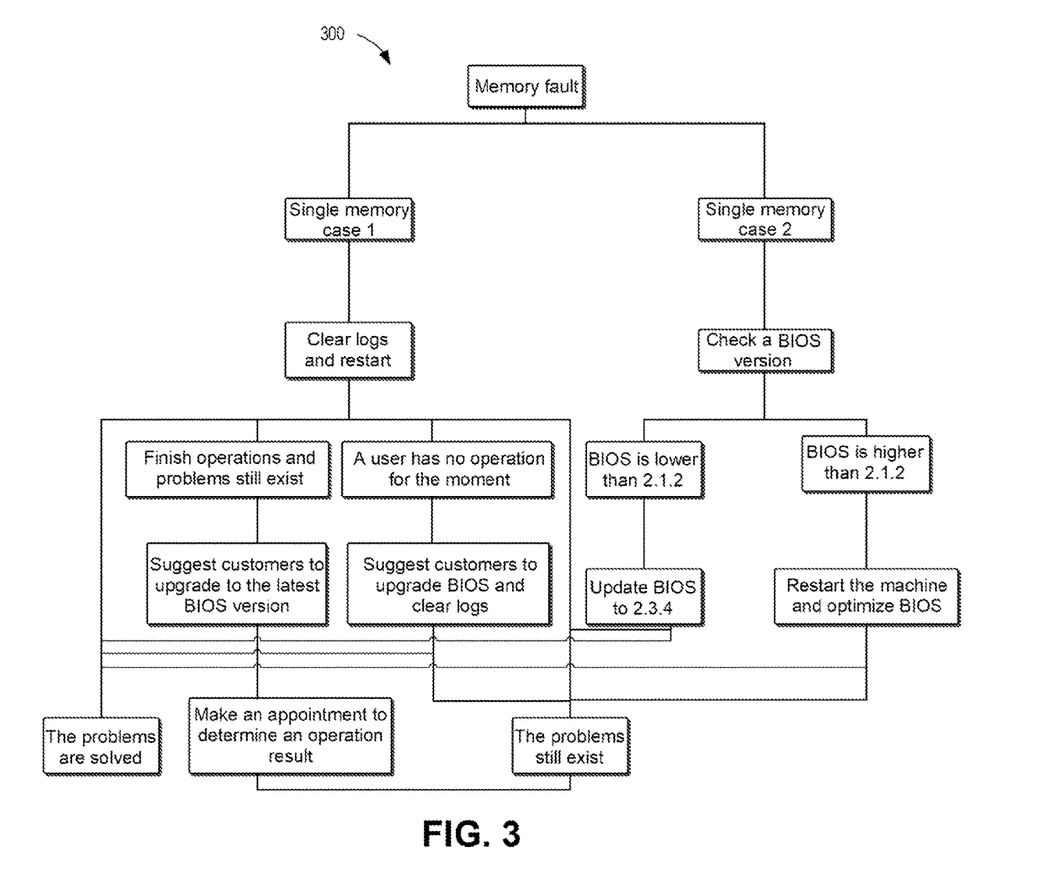
FIG. 3 shows a schematic diagram of a part of a workflow chart according to some embodiments of the present disclosure.

As shown in FIG. 3, a workflow chart 300 only shows a part of a complete workflow chart, and the complete workflow chart further includes steps other than the steps shown in FIG. 3. The workflow chart 300 includes a plurality of nodes and a plurality of edges. Each node is represented by a rectangular box and corresponds to one step in the workflow chart, and each edge represents a connecting line between two rectangular boxes. That is to say, each node corresponds to each step of the workflow chart, and the edges represent the connecting lines among the rectangular boxes. The workflow chart 300 has structural information. FIG. 3 shows a workflow chart for a memory fault. As for the memory fault, there are single memory cases 1 and 2, and the process flows are different for each.

Returning to FIG. 2, when the steps shown at box 201 are executed, the workflow chart may be encoded into a picture first, and the picture completely shows all the required workflow charts, such as workflow charts of all solutions for solving a certain problem. For example, as for a problem that a computer cannot be turned on, there may be a plurality of solutions, and each solution corresponds to a complete workflow chart or a branch of a complete workflow chart. Structural levels or structural information placed in workflow charts may be independently designed by service providers according to needs, but those skilled in the art should understand that each workflow chart has its own graph representation and structural information. Then, a graph (such as a topological graph including nodes and edges) may be input into a GNN to encode structural information contained in a graph representation of the graph to obtain a vector representation of the structural information. The vector representation may be a vector representation with a fixed length. The GNN is very suitable for this task, because this network is designed and operated based on data of a graph structure, and can effectively encode graph information into a vector representation.

In order to clearly explain how to encode the structural information of the workflow chart to obtain the vector representation of the structural information, an encoding process 400 will be described with reference to FIG. 4.

The vector representation of the structural information is also referred to as a soft prompt, obtaining this soft prompt is a key step, because the structural information of the graph can be encoded into a compact and continuous vector representation through this step, and the vector representation can be used as an input to a language model. One mode is to use a combination of a graph convolutional network (GCN) and a graph attention network (GAT) to process the graph to obtain the vector representation of its structural information, namely, the soft prompt.

The GCN operates a graph adjacent matrix and node features on the graph to calculate a continuous representation of each node, and because there is a relationship between each node and its adjacent nodes, the closer the nodes, the closer the relationship therebetween, when processing a certain node, the GCN not only needs to consider its own node features, but also needs to consider the graph adjacent matrix.

Figure 4:
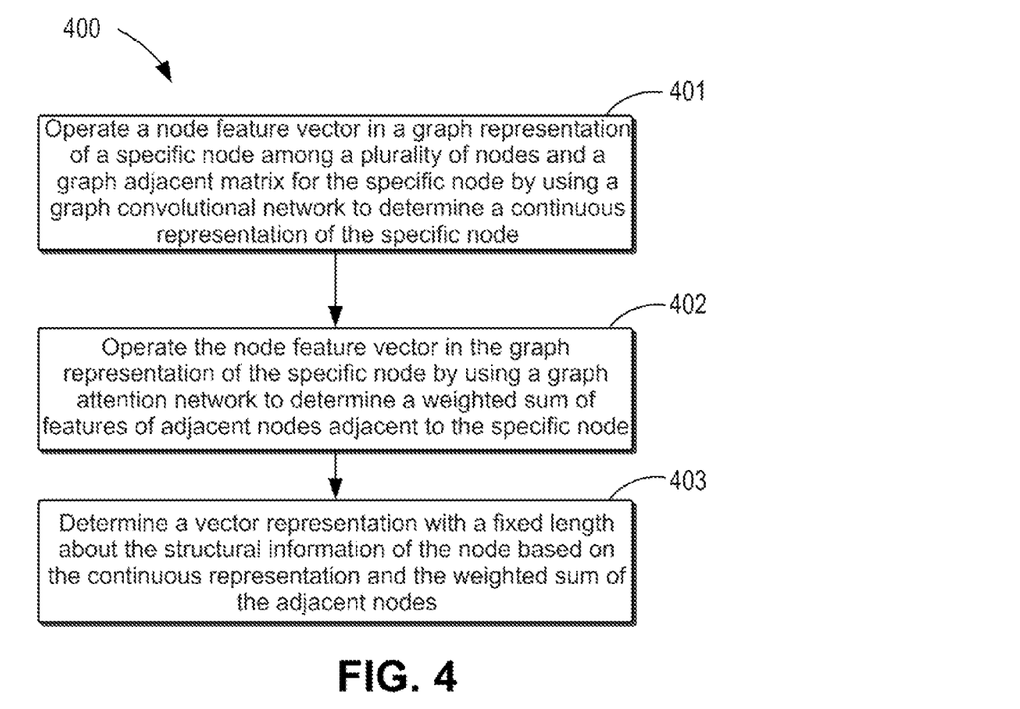
FIG. 4 shows a schematic diagram of a process of encoding structural information of a workflow chart to obtain a vector representation of the structural information according to some embodiments of the present disclosure.

Therefore, as shown in process 400 of FIG. 4, at box 401, a GCN is used to operate a node feature vector in the graph representation of a specific node among the plurality of nodes and a graph adjacent matrix for the specific node to determine a continuous representation of the specific node. Here, the specific node should be each node in all nodes contained in the workflow chart, and since it is necessary to know the structural information of the workflow chart, it is necessary to learn features of each node and the relationship between two nodes. The graph in the GCN is illustratively a topological graph in mathematics or graph theory that uses nodes and edges to establish adjacent relationships.

For example, let $A \in R^{n \times n}$ be a graph adjacent matrix, wherein n is the number of nodes in the graph. A vector representation of an $i^{th}$ node is $x_i \in R^d$, wherein d represents a dimension of the node feature vector. Then, an output representation $h_i$ (namely, the continuous representation) about the node in the GCN may be represented through the following formula (1):

$$h_i = \sigma\left(\sum_{j=1}^{n} A_{i,j} W_{x_j}\right) \quad (1)$$

wherein σ represents an activation function, $A_{i,j}$ represents an adjacent matrix of a node i and a node j, $x_j$ represents a node feature vector of the $j^{th}$ node, and W represents a weighted matrix that may be learned.

As shown in FIG. 4, at box 402, a GAT operates the node feature vector in the graph representation of the specific node to determine a weighted sum of features of adjacent nodes adjacent to the specific node. In a topological structure of a graph, one node may be adjacent to a plurality of nodes, so that there is a relationship among these adjacent nodes, and the GAT performs attention operation on the adjacent nodes j on the graph for each node i. The attention mechanism allows the GAT to dynamically weight contributions of different adjacent nodes to the specific node based on their importance.

For the node i, a similarity coefficient $e_{i,j}$ between its adjacent node j and node j is calculated one by one through the following formula (2):

$$e_{i,j} = LeakyReLu(a^T[W_{x_i} \| W_{x_j}]) \quad (2)$$

wherein a leaky rectification linear unit function (LeakyReLu) is an activation function; $a \in R^{2dout}$ is a learnable attention vector; W is a shared parameter whose linear mapping increases the dimensionality of node features, which is a common method of feature enhancement; and ∥ represents that concatenation is performed on features of the node i and the node j after transformation.

Based on the above calculated similarity coefficient $e_{i,j}$, an attention score $a_{i,j}$ between the node i and the node j is calculated according to the following formula (3):

$$a_{i,j} = softmax(e_{i,j}) \quad (3)$$

wherein softmax is an activation function.

The function softmax may be represented according to the following formula (4):

$$a_{i,j} = \frac{\exp(LeakyReLu(e_{i,j}))}{\sum_{k=1}^{n} \exp(LeakyReLu(e_{i,k}))} \quad (4)$$

wherein n represents the number of the adjacent nodes.

After the attention score $a_{i,j}$ is calculated, an output (namely, the weighted sum of features of the adjacent nodes) of GAT is calculated through the following formula (5):

$$h_i = \sigma\left(\sum_{j=1}^{n} A_{i,j} W x_j\right) \quad (5)$$

wherein σ represents an activation function, W represents a shared parameter, and $x_j$ represents a feature vector of the $j^{th}$ node.

Returning to FIG. 4, at box 403, a vector representation with a fixed length about the structural information of the node is determined based on the continuous representation and the weighted sum of features of the adjacent nodes. That is to say, based on the continuous representation for the $i^{th}$ node output by the GCN and the weighted sum of features of adjacent nodes of the $i^{th}$ node output by the GAT, a vector representation with a fixed length of the structural information for the $i^{th}$ node can be obtained, which is a soft prompt for the node. The soft prompt can be directly input into a language model GPT, so it can be understood by GPT.

The vector representations output by the CGN and the GAT are combined through the following formula (6):

$$h_i^{comb} = \sigma(h_i^{GCN} + h_i^{GAT}) \quad (6)$$

The combined vector representation may be used as a soft prompt for training the language model GPT, and the soft prompt contains the structural information of all nodes in the workflow chart. The soft prompt is input into the language model GPT, the language model GPT can understand information of a graph, such as structural information, and learn the structural information of the graph to know architecture information of the workflow chart, so that a complete description of the workflow chart can be acquired.

In utilizing two types of GNN in some embodiments, a combined soft prompt is generated through the GCN and the GAT. The combined soft prompt can be obtained through the following operations: first, using the GCN to execute preliminary feature propagation, and then using the GAT to execute attention-based weighting of a plurality of node features. The vector representation obtained by combining the GCN and the GAT can be used as the soft prompt for the language model GPT.

Returning to FIG. 2, at box 202, the computing device 102 acquires textual description data about the workflow chart at the nodes. The textual description data may also be referred to as a hard prompt which is directly input into the language model GPT. Here, the nodes do not need to be all nodes, but may be only a part of the nodes. They may be several steps which are first executed in the workflow chart, or the steps necessary to execute a specific task. For example, if a customer needs a solution, the necessary step may be: if the customer complains, a solution is provided. In the method according to the present disclosure, only the textual description data or the hard prompt of the one step may be needed.

Generating the hard prompt is a second key step of the method according to the present disclosure, and through this step, the graph representation of the workflow chart can be encoded into a prompt language that can be understood by the language model. The hard prompt is a textual description of the steps in the workflow chart, which provides extra information to the language model. The hard prompt provides details necessary to enable the language model GPT to finish the task. The graph representation of the workflow chart is used as an input, and information is extracted from node features and edge features of the graph representation of the workflow chart, so that the hard prompt can be generated.

A process 500 for generating textual description data of nodes will be described in detail below with reference to FIG. 5.

Figure 5:
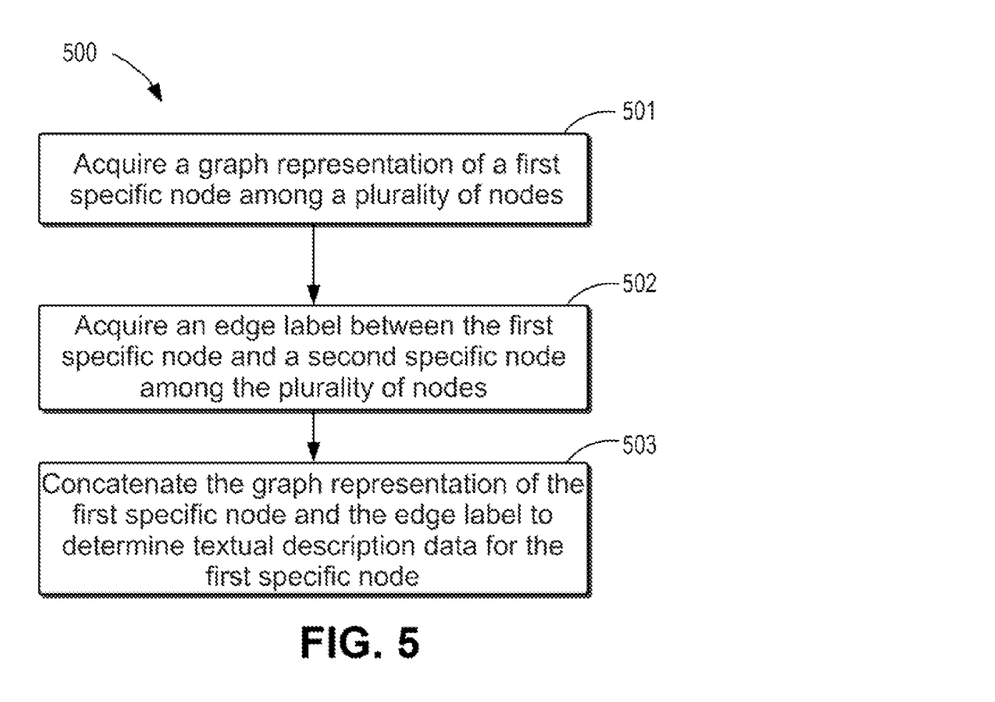
FIG. 5 shows a schematic diagram of a process for generating textual description data of nodes according to some embodiments of the present disclosure.

As shown in FIG. 5, at box 501, a graph representation of a first specific node among a plurality of nodes is acquired. The first specific node can be one node in a predetermined number of nodes. For example, the information represented by the specific node can be: if a customer complains, a solution is generated.

At box 502, an edge label between the first specific node and a second specific node among the plurality of nodes is acquired. The second feature node is one of several nodes having a relationship with the first specific node through edges. For example, two steps in the workflow chart are connected through a connecting line, and then there may be an edge label on the connecting line between them.

At box 503, the graph vector representation of the first specific node and the edge label are concatenated to determine the textual description data for the first specific node.

For example, the hard prompt $h_{hard}$ is calculated through the following formula (7):

$$h_{hard} = [\![x_i \| l_{i,j}]\!] \quad (7)$$

wherein $x_i$ represents a feature vector of the $i^{th}$ node in the workflow chart, and $l_{i,j}$ represents an edge label between a node i and a node j in the graph representation of the workflow chart.

In the method as shown in FIG. 5, the edge label between the node i and the node j is extracted, and then the edge label and the feature vector of the node i are concatenated to obtain the hard prompt for the node i. That is to say, the hard prompt is generated by describing the relationship among the plurality of nodes of the graph representation. The method can better model the relationship between two nodes.

Although the above describes an example method of obtaining the hard prompt by describing the relationship among the plurality of nodes, the hard prompt may further be obtained according to other modes.

For example, let $x_i$ represent a feature vector of the $i^{th}$ node in the workflow chart, wherein $x_i \in R^d$, and d represents the dimensionality of the node feature vector. The hard prompt can also be generated by concatenating node representations or node feature vectors of a plurality of steps arranged in a predetermined order in the workflow chart. For example, the hard prompt may be generated through the following formula (8):

$$h_{hard} = [x_1 \| x_2 \| x_3 \| \ldots \| x_k] \quad (8)$$

wherein 1, 2, . . . k represent k steps arranged in the predetermined order in the workflow chart, and ∥ represents concatenating the features of the nodes.

Returning to refer to FIG. 2, at box 203, the computing device 102 trains a language model based on the acquired textual description data and the acquired vector representation to acquire a pretrained language model. Pretraining is a key step of the method according to the present disclosure, and this step allows the GPT to learn a basic structure of the graph representation of the workflow chart. When the soft prompt generated in box 201 and the hard prompt generated in box 202 (if the generated hard prompt includes the hard prompts of steps other than the necessary steps, only the hard prompts of the necessary steps need to be provided) are given, and in a case of executing a graph finishing task, this step allows the GPT to generate a complete description of the workflow chart.

In a pretraining process, the GPT executes the graph finishing task, the soft prompt and a part of the hard prompt (such as the hard prompts of the necessary steps) are used as inputs, and then a complete textual description of the workflow chart is generated. The training progress may be quantified through a loss function, and this loss function measures a difference between the generated text and the real text. A goal of the pretraining is to minimize the loss function, which may achieve adjustment of parameters of the GPT by using an optimization algorithm, such as a stochastic gradient descent (SGD) algorithm.

The loss function calculates the difference between the generated text and the real text, the graph of the input to the workflow chart is represented as G, the soft prompt generated through the GNN (such as using a GCN and a GAT) is S, the generated hard prompt is H, and the real textual description of the workflow chart is T, and then the loss function may be calculated through the following formula (9):

$$\text{Loss} = \| GPT(S, H) - T \| \quad (9)$$

wherein GPT (S, H) is the text generated by the GPT in the case where the soft prompt S and the hard prompt H are given, and T is the real textual description of the workflow chart.

The loss function may be further decomposed into two terms: Reconstruction loss ReconstructionLoss and adversarial loss AdversarialLoss. The reconstruction loss measures the difference between the generated text and the real text, and the adversarial loss forces the generated text to be similar in language style, grammar, and vocabulary with the real text.

Therefore, considering the above two types of loss, the loss function may be calculated through the following formula (10):

$$\text{Loss} = ReconstructionLoss + AdversarialLoss \quad (10)$$

The pretraining process may use an unsupervised learning algorithm, such as autoencoder-based training, generative adversarial network (GAN) training, or variational autoencoder (VAE) training. The selection of the training algorithm depends on specific requirements of the task and the required attributes for generating the text.

The reconstruction loss measures the generated output and a real target. It is usually defined as a mean square error (MSE) between the generated output and the real target, and the reconstruction loss can be calculated through the following formula (11):

$$L_{rec} = \frac{1}{N} \sum_{i=1}^{N} (y_i - \hat{y}_i)^2 \quad (11)$$

wherein N represents the number of instances in a training set, $y_i$ represents the real target, and $\hat{y}_i$ represents the generated output.

The adversarial loss measures a confidence coefficient of a discriminator, and the confidence coefficient determines whether the generated output comes from a real data distribution. It is usually defined as a binary cross entropy loss between a predication probability and a target label, wherein a label 0 represents the real data, a label 1 represents the generated data, and the adversarial loss is calculated through the following formula (12):

$$L_{adv} = -\frac{1}{N}\sum_{i=1}^{N}\left[y_{adv,i}\log(\hat{y}_{adv,i}) + (1 - y_{adv,i})\log(1 - \hat{y}_{adv,i})\right] \quad (12)$$

wherein $y_{adv,i}$ represents a target label indicating whether a sample is a real sample or a generated sample, and $\hat{y}_{adv,i}$ represents that sampling is a real prediction probability. It should be noted that parameters of the GNN (e.g., the GCN and GAT) and the GPT are jointly pretrained, that is to say, their parameters may all be adjusted.

Returning to FIG. 2, at box 204, the computing device 102 fine-tunes the pretrained language model through training data of a specific task to acquire a fine-tuned language model. After the language model is pretrained, the pretrained language model may be used to execute the specific task, so that in a process of executing the task, the parameters of the pretrained language model are further adjusted to optimize the performance of the model to execute the specific task. Fine-tuning of the model is executed through the following process: inputting the soft prompt and a part of the hard prompt generated by the GNN and the specific task as training data, and then fine-tuning the parameters of the GPT model to generate a specific solution of the specific task. This is the main difference between the pretraining process and the fine-tuning process, the fine-tuning process needs to input a specific task (the specific task may be used as a part of the input) and provide a specific solution for this task, while the pretraining process is to learn the structural information of the workflow chart contained in the graph.

Figure 6:
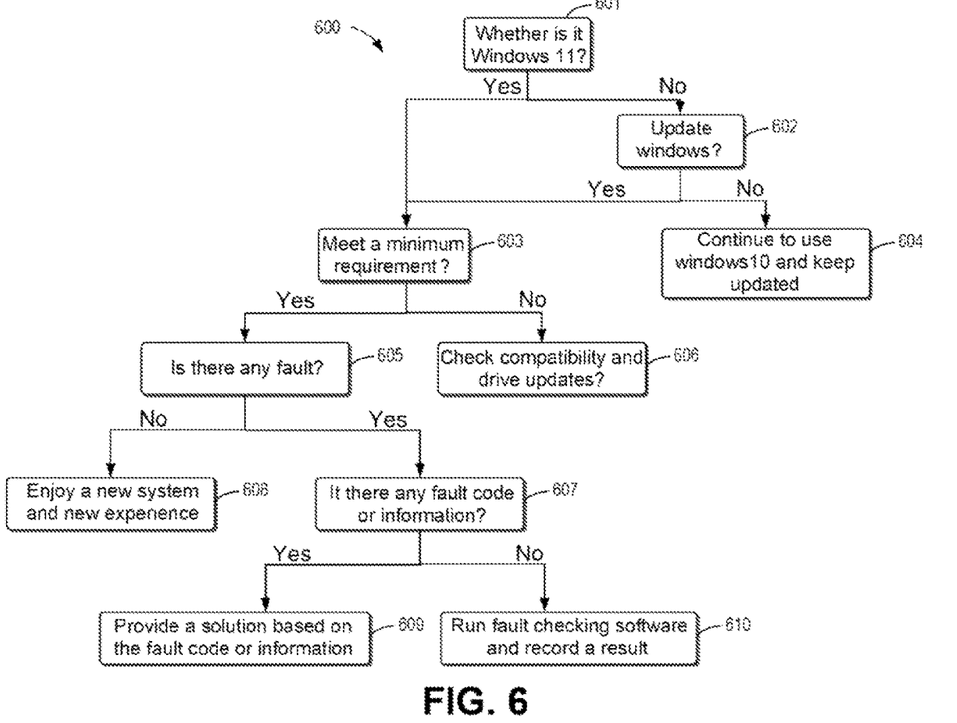
FIG. 6 shows a schematic diagram of for a specific task in a fine-tuning process according to some embodiments of the present disclosure.

The model fine-tuning process needs to provide a desired solution for this task. The user inputs this task into the pretrained GPT, and then the GPT raises some questions according to this task. The questions that may be provided for the specific task during model fine-tuning will be described below with reference to FIG. 6. FIG. 6 shows a schematic diagram for a specific task in a fine-tuning process 600. As shown in FIG. 6, at a first box 601, the pretrained GPT asks "Is it win11?" and if the user answers no, the pretrained GPT proceeds to box 602 and asks "Update windows?" If the user answers yes regarding whether it is a win11 system, the pretrained GPT proceeds to box 603, and asks "Meet a minimum requirement?"

If the user selects yes regarding the question at box 602, the pretrained GPT proceeds to box 603; otherwise, the pretrained GPT proceeds to box 604, with a prompt at box 604 of "Continue using win10 and keep updated." If the user selects yes regarding the question at box 603, the pretrained GPT proceeds to box 605, and at box 605, the pretrained GPT asks "Is there any fault?" If the user selects no regarding the question at box 603, the pretrained GPT proceeds to box 606, with a prompt at box 606 of "Check compatibility and drive updates."

If the user selects yes regarding the question at box 605, the pretrained GPT proceeds to box 607, and asks at box 607 "Is there any fault code or information?" If the user selects no regarding the question at box 605, the pretrained GPT proceeds to box 608, with a prompt at box 608 of "Enjoy a new system and new experience." If the user selects yes regarding the question at box 607, the pretrained GPT proceeds to box 609, with a prompt at box 609 to "Provide a solution based on the fault code or information," and then the pretrained GPT will provide a solution based on the fault code or information. If the user selects no regarding the question at box 607, the pretrained GPT proceeds to box 610, with a prompt at box 610 of "Run fault checking software and record a result."

The target function of model fine-tuning may be represented through the following formula (13):

$$L_{Fine-Tuning} = \sum_{i=1}^{N} L_{Prediction}(y_i, \hat{y}_i) + \lambda L_{Regularization}(\theta) \quad (13)$$

wherein N represents the number of samples, $L_{Prediction}(y_i, \hat{y}_i)$ is a prediction loss of an error before measuring a real label $y_i$ and a prediction label $\hat{y}_i$, $L_{Regularization}(\theta)$ is a regularization loss, which will punish a complex model and help prevent overfitting, and $\lambda$ is a hyperparameter that controls the balance between the prediction loss and the regularization loss.

The prediction loss can be defined as a cross entropy loss through the following formula (14):

$$L_{Prediction}(y_i, \hat{y}_i) = -\sum j = 1^V y_{ij}\log\hat{y}_{ij} \quad (14)$$

wherein V represents a size of a vocabulary, and $y_{ij}$ and $\hat{y}_{ij}$ are a real probability and a prediction probability of the $j^{th}$ word in the vocabulary, respectively.

The regularization loss can be defined as an L2 regularization term through the following formula (15):

$$L_{Regularization}(\theta) = \frac{1}{2}\sum_{k=1}^{K}\theta_k^2 \quad (15)$$

wherein k is the number of parameters in the model, and $\theta_k$ is the $k^{th}$ parameter.

The fine-tuning process may be executed by using a gradient-based optimization algorithm, such as stochastic gradient descent (SGD) or adaptive moment estimation (Adam), the gradient of the target function relative to the parameters is calculated, and the parameters in a negative gradient direction are updated. The optimization process continues to be performed until the target function converges or reaches a predefined number of iterations.

In the method according to the present disclosure, in a case where a graph representation of a workflow chart is known, a GNN, such as a GCN and a GAT, is used to encode structural information of the graph representation to generate a soft prompt, and the soft prompt contains a complete encoding of graph information, can be understood by GPT, and can be directly input into GPT. A hard prompt is a text description of a specific step of the workflow chart, and the text description is a comprehensive and detailed description of the specific step of the workflow chart. According to the method of the present disclosure, both the soft prompt and the hard prompt are considered. The generated soft prompt and the hard prompt (the hard prompt is only for some necessary steps, not all steps) are taken as inputs, a graph finishing task is used to pretrain the GPT, so that the GPT can know a basic structure or an underlying structure of the workflow chart, namely, learning the whole workflow chart, so as to achieve a complete description of the workflow chart. In the fine-tuning process, the parameters of the GPT are fine-tuned, and only the soft prompt and a part of the hard prompt are input to finish the specific task to output a solution for the specific task, so as to optimize the performance of the specific task. In the fine-tuning process, if the specific tasks are different, the parameters of the GPT to be fine-tuned are also different. Through the fine-tuning process, the performance of executing the specific tasks by the pretrained GPT can be optimized, so that the GPT executes the tasks more effectively, and the provided solution is more accurate.

The method for processing a workflow chart according to the present disclosure can have practical applications in providing effective and organized customer service in various industrial scenarios. Compared with a conventional method, the method for processing a workflow chart according to the present disclosure has significant improvements in accuracy and efficiency. The advantages of the method for processing a workflow chart according to the present disclosure include providing improved customer service, making workflow tasks simpler and more automated, enhancing the ability to process a large number of complex graphs, and enhancing the ability to effectively generate natural language outputs. Specifically, the method for processing a workflow chart according to the present disclosure has an accuracy of 82%, and the execution time is shortened by 30%.

The method for processing a workflow chart according to the present disclosure may be applied to various scenarios. For example, it may provide efficient and organized customer service for various industries. The information in a predefined workflow chart is encoded into a language model, so that services such as after-sales service are provided for customers through the language model. In addition, management of a workflow chart may further be provided, and the workflow chart is encoded into a graph representation, so that the management and progress tracking of the workflow chart become easier. Further, knowledge management may further be provided, it may be used for encoding and storing specific knowledge of a company through a text-based language model, so that it is easier to search for and retrieve relevant information. In addition, daily task automation services may further be provided, which automate daily tasks by encoding information in a predefined workflow chart into information of a text-based language model.

The above description is only an example of some application scenarios of the method of the present disclosure, and this solution may be adapted to and be used in various scenarios in other fields that require encoding a predefined workflow chart into a text-based language model.

Example Device

Figure 7:
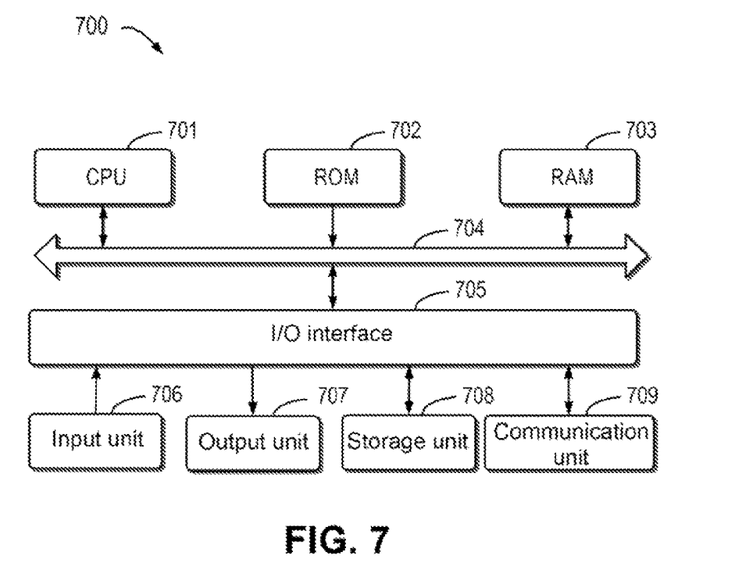
FIG. 7 shows a block diagram of a computing device that can implement multiple embodiments of the present disclosure.

FIG. 7 shows a schematic block diagram of an example device 700 which can be used to implement embodiments of the present disclosure. The device 700 can be used to implement the computing device 102 in FIG. 1. As shown in the figure, the device 700 includes a central processing unit (CPU) 701 that may execute various appropriate actions and processing according to computer program instructions stored in a read-only memory (ROM) 702 or computer program instructions loaded from a storage unit 708 to a random access memory (RAM) 703. Various programs and data required for the operation of the device 700 may also be stored in the RAM 703. The CPU 701, the ROM 702, and the RAM 703 are connected to each other through a bus 704. An Input/Output (I/O) interface 705 is also connected to the bus 704.

A plurality of components in the device 700 are connected to the I/O interface 705, including: an input unit 706, such as a keyboard and a mouse; an output unit 707, such as various types of displays and speakers; a storage unit 708, such as a magnetic disk and an optical disc; and a communication unit 709, such as a network card, a modem, and a wireless communication transceiver. The communication unit 709 allows the device 700 to exchange information/data with other devices via a computer network, such as the Internet, and/or various telecommunication networks.

The CPU 701 executes various methods and processing described above, e.g., any one of the processes 200, 400, 500, and 600. For example, in some embodiments, any one of the processes 200, 400, 500, and 600 may be implemented as a computer software program that is tangibly included in a machine-readable medium, for example, the storage unit 708. In some embodiments, part or all of the computer program may be loaded and/or installed onto the device 700 via the ROM 702 and/or the communication unit 709. When the computer program is loaded into the RAM 703 and executed by the CPU 701, one or more steps of any one of the processes 200, 400, 500, and 600 described above can be executed. Alternatively, in other embodiments, the CPU 701 may be configured in any other suitable manner (e.g., by means of firmware) to implement any one of the processes 200, 400, 500, and 600.

The functions described herein may be performed at least in part by one or more hardware logic components. For example, without limitation, example types of available hardware logic components include: a field programmable gate array (FPGA), an application specific integrated circuit (ASIC), an application specific standard product (ASSP), a system on chip (SOC), a complex programmable logic device (CPLD), and the like.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the workflow charts and/or block diagrams. The program code may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a RAM, a ROM, an erasable programmable read-only memory (EPROM or flash memory), an optical fiber, a portable compact disk read-only memory (CD-ROM), an optical storage device, a magnetic storage device, or any suitable combinations thereof.

Additionally, although operations are depicted in a particular order, it should be understood that such operations are not required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

What is claimed is:

1. A method for processing a workflow chart, comprising:
   encoding structural information of the workflow chart comprising a plurality of nodes and a plurality of edges by using a graph neural network to acquire a vector representation of the structural information;
   acquiring textual description data about the workflow chart at the nodes;
   training a language model based on the acquired textual description data and the acquired vector representation to acquire a pretrained language model, wherein the pretrained language model represents a trained language model prior to fine-tuning in one or more additional training operations to generate a fine-tuned language model; and
   fine-tuning the pretrained language model through training data of a specific task to acquire the fine-tuned language model.

2. The method according to claim 1, wherein training the language model based on the acquired textual description data and the acquired vector representation comprises:
   taking the vector representation of the structural information and the textual description data of a predetermined number of nodes among the plurality of nodes as inputs to the language model, causing the language model to execute a graph finishing task to pretrain the language model, so as to generate a complete description of the workflow chart.

3. The method according to claim 2, wherein parameters of the language model are adjusted based on a difference between a real text for at least one specific node among the plurality of nodes and a text generated by the language model for the at least one specific node according to the graph finishing task, so as to acquire the complete description for the workflow chart.

4. The method according to claim 1, wherein encoding structural information of the workflow chart comprising the plurality of nodes and the plurality of edges by using the graph neural network to acquire the vector representation of the structural information comprises:
   operating a node feature vector in a graph representation of a specific node among the plurality of nodes and a graph adjacent matrix for the specific node by using a graph convolutional network to determine a continuous representation of the specific node, wherein the specific node is each node among the plurality of nodes;
   operating the node feature vector in the graph representation of the specific node by using a graph attention network to determine a weighted sum of features of adjacent nodes adjacent to the specific node; and
   determining a vector representation with a fixed length about the structural information of the node based on the continuous representation and the weighted sum of features of the adjacent nodes.

5. The method according to claim 1, wherein acquiring the textual description data about the workflow chart at the nodes comprises:
   acquiring a graph representation of a first specific node among the plurality of nodes, wherein the first specific node comprises one node in a predetermined number of nodes among the plurality of nodes;
   acquiring an edge label between the first specific node and a second specific node among the plurality of nodes; and
   concatenating the graph representation of the first specific node and the edge label to determine textual description data for the first specific node.

6. The method according to claim 1, wherein the textual description data of the workflow chart at the nodes comprises textual description data at a predetermined number of nodes, and the predetermined number of nodes correspond to a first executed number or a predetermined number, as required to implement the specific task, of steps in the workflow chart.

7. The method according to claim 1, wherein the workflow chart comprises a plurality of branches, each branch comprises at least one node and at least one edge, and different branches correspond to different solutions for the specific task.

8. An electronic device, comprising:
   at least one processor; and
   at least one memory, coupled to the at least one processor and having instructions stored thereon, wherein the instructions, when executed by the at least one processor, cause the electronic device to execute actions comprising:
   encoding structural information of a workflow chart comprising a plurality of nodes and a plurality of edges by using a graph neural network to acquire a vector representation of the structural information;
   acquiring textual description data about the workflow chart at the nodes;
   training a language model based on the acquired textual description data and the acquired vector representation to acquire a pretrained language model, wherein the pretrained language model represents a trained language model prior to fine-tuning in one or more additional training operations to generate a fine-tuned language model; and
   fine-tuning the pretrained language model through training data of a specific task to acquire the fine-tuned language model.

9. The electronic device according to claim 8, wherein training the language model based on the acquired textual description data and the acquired vector representation comprises:
   taking the vector representation of the structural information and the textual description data of a predetermined number of nodes among the plurality of nodes as inputs to the language model, causing the language model to execute a graph finishing task to pretrain the language model, so as to generate a complete description of the workflow chart.

10. The electronic device according to claim 9, wherein parameters of the language model are adjusted based on a difference between a real text for at least one specific node among the plurality of nodes and a text generated by the language model for the at least one specific node according to the graph finishing task, so as to acquire the complete description for the workflow chart.

11. The electronic device according to claim 8, wherein encoding the structural information of the workflow chart comprising the plurality of nodes and the plurality of edges by using the graph neural network to acquire the vector representation of the structural information comprises:
operating a node feature vector in a graph representation of a specific node among the plurality of nodes and a graph adjacent matrix for the specific node by using a graph convolutional network to determine a continuous representation of the specific node, wherein the specific node is each node among the plurality of nodes;
operating the node feature vector in the graph representation of the specific node by using a graph attention network to determine a weighted sum of features of adjacent nodes adjacent to the specific node; and
determining a vector representation with a fixed length about the structural information of the node based on the continuous representation and the weighted sum of features of the adjacent nodes.

12. The electronic device according to claim 8, wherein acquiring the textual description data about the workflow chart at the nodes comprises:
acquiring a graph representation of a first specific node among the plurality of nodes, wherein the first specific node comprises one node in a predetermined number of nodes among the plurality of nodes;
acquiring an edge label between the first specific node and a second specific node among the plurality of nodes; and
concatenating the graph representation of the first specific node and the edge label to determine textual description data for the first specific node.

13. The electronic device according to claim 8, wherein the textual description data of the workflow chart at the nodes comprises textual description data at a predetermined number of nodes, and the predetermined number of nodes correspond to a first executed number or a predetermined number, as required to implement the specific task, of steps in the workflow chart.

14. The electronic device according to claim 8, wherein the workflow chart comprises a plurality of branches, each branch comprises at least one node and at least one edge, and different branches correspond to different solutions for the specific task.

15. A computer program product, the computer program product being tangibly stored on a non-transitory computer-readable medium and comprising machine-executable instructions, wherein the machine-executable instructions, when executed by a machine, cause the machine to execute actions comprising:
encoding structural information of a workflow chart comprising a plurality of nodes and a plurality of edges by using a graph neural network to acquire a vector representation of the structural information;
acquiring textual description data about the workflow chart at the nodes;
training a language model based on the acquired textual description data and the acquired vector representation to acquire a pretrained language model, wherein the pretrained language model represents a trained language model prior to fine-tuning in one or more additional training operations to generate a fine-tuned language model; and
fine-tuning the pretrained language model through training data of a specific task to acquire the fine-tuned language model.

16. The computer program product according to claim 15, wherein training the language model based on the acquired textual description data and the acquired vector representation comprises:
taking the vector representation of the structural information and the textual description data of a predetermined number of nodes among the plurality of nodes as inputs to the language model, causing the language model to execute a graph finishing task to pretrain the language model, so as to generate a complete description of the workflow chart.

17. The computer program product according to claim 16, wherein parameters of the language model are adjusted based on a difference between a real text for at least one specific node among the plurality of nodes and a text generated by the language model for the at least one specific node according to the graph finishing task, so as to acquire the complete description for the workflow chart.

18. The computer program product according to claim 15, wherein encoding the structural information of the workflow chart comprising the plurality of nodes and the plurality of edges by using the graph neural network to acquire the vector representation of the structural information comprises:
operating a node feature vector in a graph representation of a specific node among the plurality of nodes and a graph adjacent matrix for the specific node by using a graph convolutional network to determine a continuous representation of the specific node, wherein the specific node is each node among the plurality of nodes;
operating the node feature vector in the graph representation of the specific node by using a graph attention network to determine a weighted sum of features of adjacent nodes adjacent to the specific node; and
determining a vector representation with a fixed length about the structural information of the node based on the continuous representation and the weighted sum of features of the adjacent nodes.

19. The computer program product according to claim 15, wherein acquiring the textual description data about the workflow chart at the nodes comprises:
acquiring a graph representation of a first specific node among the plurality of nodes, wherein the first specific node comprises one node in a predetermined number of nodes among the plurality of nodes;
acquiring an edge label between the first specific node and a second specific node among the plurality of nodes; and
concatenating the graph representation of the first specific node and the edge label to determine textual description data for the first specific node.

20. The computer program product according to claim 15, wherein the textual description data of the workflow chart at the nodes comprises textual description data at a predetermined number of nodes, and the predetermined number of nodes correspond to a first executed number or a predetermined number, as required to implement the specific task, of steps in the workflow chart.

* * * * *